United States Patent

Jimenez

[11] 3,745,675
[45] July 17, 1973

[54] EDUCATIONAL PUZZLE
[76] Inventor: David J. Jimenez, P. O. Box 3458 Station "A", El Paso, Tex. 79923
[22] Filed: Sept. 12, 1972
[21] Appl. No.: 288,339

[52] U.S. Cl. .................................................. 35/73
[51] Int. Cl. ............................................ G09b 1/06
[58] Field of Search ................. 35/8 R, 9 R, 9 D, 35/28, 31 D, 31 F, 31 G, 35 H, 35 J, 69, 70, 71, 72, 73; 273/153 R, 156, 157 R

[56] References Cited
UNITED STATES PATENTS

| | | | |
|---|---|---|---|
| 1,085,405 | 1/1914 | Dadd | 35/73 X |
| 2,310,800 | 2/1943 | Manhart | 35/69 X |
| 2,327,059 | 8/1943 | Pal | 35/28 X |
| 2,711,595 | 6/1955 | Sharp | 35/35 H |

Primary Examiner—Wm. H. Grieb
Attorney—Harvey B. Jacobson

[57] ABSTRACT

An educational puzzle for a teaching recognition of letter and number symbols, said puzzle comprising a base with a recessed mounting surface framed on two sides by a raised, three-dimensional figure of a clown, or the like, and inserts shaped in the form of letter or number symbols and adapted to fit on the mounting surface, each insert including an arcuate cut-out or notch on its peripheral edge which completes the face of the clown to produce a smile when the insert is properly oriented on the mounting surface.

10 Claims, 4 Drawing Figures

PATENTED JUL 17 1973 3,745,675

EDUCATIONAL PUZZLE

The present invention is generally related to puzzles and, more particularly, to training devices for use by mentally retarded, visually or perceptually impaired and pre-school children to aid them in learning letter and number symbols.

It is an object of the present invention to provide a novel educational puzzle to aid in the recognition of letters and numbers by the manipulation and proper orientation of inserts on a mounting base.

Another object of the present invention is to provide a versatile educational puzzle including a mounting base with a figure of a clown, or the like, thereon together with letter and number inserts which make up part of the figure when manipulated into proper position on the mounting base.

It is a further object of the present invention to provide a unique educational puzzle including a mounting base with the figure of a clown, or the like, thereon adapted to receive letter and number inserts, each with a cut-out or notch on its periphery which completes the clown face to produce a smile upon proper positioning on the mounting base.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
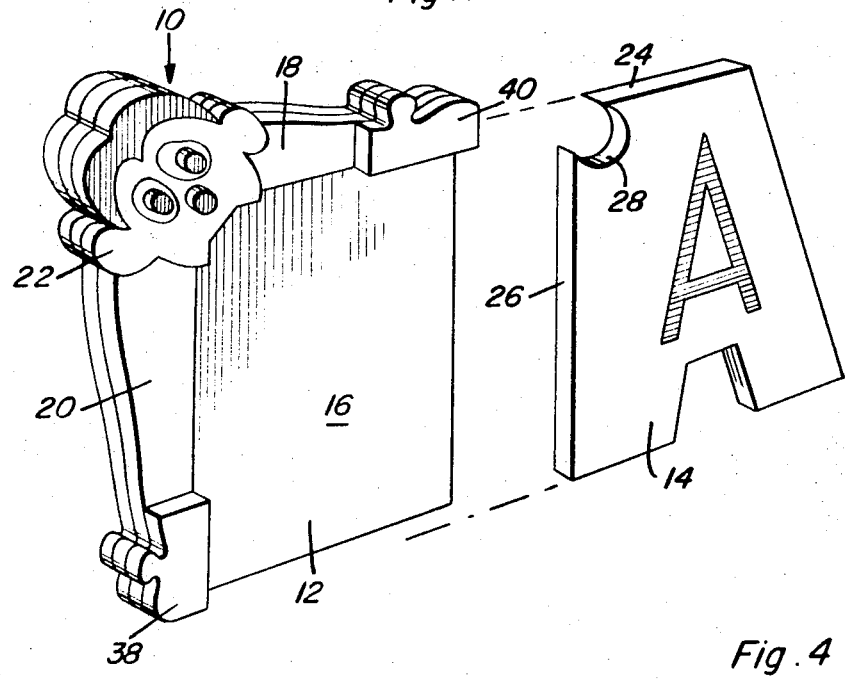
FIG. 1 is an exploded perspective view of the educational puzzle of the present invention illustrated with a letter insert.

Referring now, more particularly to FIG. 1 of the drawings, the educational puzzle of the present invention is generally indicated by the numeral 10 and includes a mounting base 12 and a letter insert 14. Preferably, the mounting base and letter insert are made from plastic or similar lightweight, durable materials. The base is provided with a mounting recess 16 which is of generally rectangular configuration and provides a substantially flat mounting surface. The recess is bordered on two sides by raised arms 18 and 20 which extend generally perpendicular to each other and are provided with straight edge surfaces which frame and define in part the mounting recess. Preferably arms 18 and 20 are associated with a comical figure and face, such as a clown's face as indicated at 22.

Figure 2:
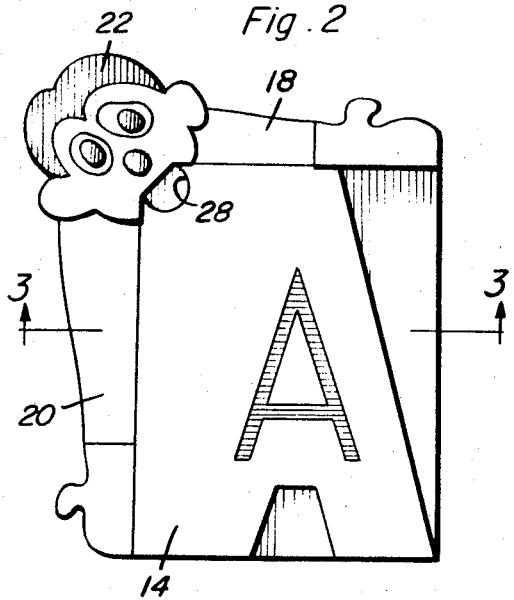
FIG. 2 is an elevational view of the educational puzzle illustrated in FIG. 1 with the letter insert in its proper position.

The letter insert is of generally flat configuration with a pair of peripheral edge portions adapted to engage the straight edges of arms 18 and 20, such as edge portions 24 and 26 associated with the letter "A" illustrated in FIG. 1. The letter insert is of appropriate size to fit in the mounting recess 16 and is provided with an arcuate cut-out or notch 28 located at one corner and adapted to cooperate with the face of the figure on the mounting base to complete such when the letter insert is properly manipulated and positioned in the recess 16. The arcuate cut-out is shaped and located in such a manner as to produce a smile on the figure face of the mounting base. This is best illustrated in FIG. 2, with the notch in the upper left-hand corner.

Figure 3:
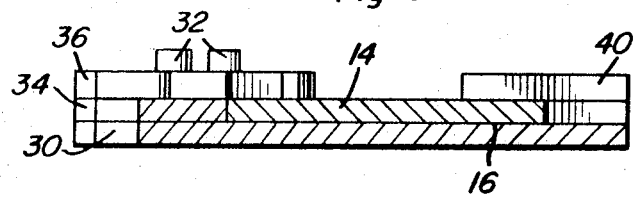
FIG. 3 is a sectional view taken along section 3—3 of FIG. 2.

With reference to FIG. 3, it will be observed that the mounting base is of laminated construction to provide a three-dimensional figure. Preferably, four laminations or layers are provided, each made of plastic and of appropriate color to provide a bright multicolored figure. A bottom lamination 30 defines the mounting surface of recess 16, while an upper lamination 32 is comprised of three separate pieces defining the eyes and nose of the clown face. A lamination 34 overlies bottom lamination 30 to provide the arms 18 and 20 which are raised above the mounting surface of recess 16. A third lamination 36 immediately above lamination 34 provides an outline for the face and defines a pair of hands or gloves 38 and 40. The laminations may be cemented or otherwise bonded together to provide a relatively rigid, multicolored structure.

Figure 4:
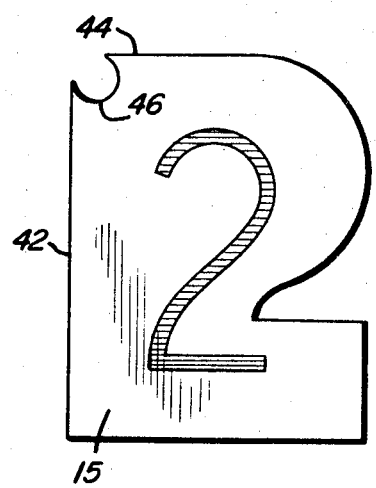
FIG. 4 is an elevational view of a typical number insert associated with the present invention.

FIG. 4 is an illustration of a typical number insert 15 associated with the present invention. It will be appreciated that the number insert is of generally rectangular configuration and of appropriate dimension for positioning in the mounting recess. Also, the upper and left hand edges 42 and 44 respectively are at right angles to each other and adapted to engage the straight edges of arms 20 and 18 when the insert is properly oriented into position. An arcuate cut-out or notch 46 is provided in the upper left hand corner of the number insert, the same as notch 28 associated with the letter insert, to provide a smile when the insert is properly positioned in the mounting recess.

From the foregoing description, it will be appreciated that the educational puzzle of the present invention provides a versatile means of aiding persons in recognizing the basic letter and number symbols or configurations. This is particularly helpful in training the mentally retarded or visually or perceptually impaired. Furthermore, the device may be utilized with preschool children in order that they may learn the alphabet and number symbols prior to formal education. It will be appreciated that the outer shape of each insert is shaped on two sides in the general configuration of the particular letter or number. This permits a child to familiarize, coordinate and establish a relationship between the outer configuration and the appearance or shape of each letter or number. While the educational puzzle of the present invention is intended to include all of the letters of the alphabet and the 10 basic number configurations, each is provided with an outside peripheral design which is noticeably different from the others in order to avoid confusion to the child through the sense of touch.

Arms 18 and 20 associated with the figure of mounting base 12 serve as a guide for the child to see and feel the letter as it is manipulated into proper position. If the insert is upside down or sideways, the child will be able to feel gaps or discontinuities between the edges of the insert and the figure arms. In addition, one arm is shorter than the other to further avoid confusion and to assure proper engagement between the insert edges and straight edges of the arms.

From the standpoint of training, the several features of the educational puzzle are most advantageous. For example, when the letter or number insert is properly positioned, such becomes most evident to the child due to the aid of the contrasting background, and clown figure which appears to embrace the insert. The rectangular mounting recess does not extend into or overlap with the figure background at any point. Thus, a sharp contrast is provided both visually and through feeling which defines that area in which the letter or number is to be inserted. The fact that the gloves or hands appear to be holding or embracing the insert when properly oriented, coupled with the fact that the face assumes a smile, provides a rewarding feeling to the child upon achieving proper orientation of the insert. On the other hand, if the child does not achieve proper positioning of the insert, a rewarding smile will not appear before his eyes. With the insert in proper position and visually correct, the child is free to stencil the symbol with a marker or trace it with his fingers. He may copy it afterward in free hand with his stencil as a model if he so chooses, thus combining both visual and tactile approaches to learning. Preferably, the educational puzzle of the present invention is utilized under supervision, so that the child will not rely heavily upon the use of stencils once having learned to copy or recognize the number and letter symbols.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An educational puzzle comprising a mounting base, and at least one insert member corresponding to a letter or number symbol, said base including a generally rectangular recess and a figure of a clown, or the like partially surrounding said recess and including a pair of arms raised above the recess and extending at generally right angles to each other, said figure including a partial face positioned at the junction of said arms, a portion of said face being immediately adjacent to said mounting recess, said insert member being removably positioned in said mounting recess and including a peripheral portion which cooperates with said partial face of said figure to complete such when the insert is properly positioned.

2. The structure set forth in claim 1 wherein said peripheral portion of said insert member forms a smile on the face of said figure.

3. The structure set forth in claim 2 wherein said peripheral portion of said insert member includes an arcuate cut-out immediately adjacent to the face of said figure when the insert member is in proper position.

4. The structure set forth in claim 3 wherein said arcuate cut-out is located in one corner of said insert member.

5. The structure set forth in claim 4 wherein said mounting base is of three-dimensional, laminated construction, one of said laminations defining said mounting surface, a portion of said mounting surface being visible through said cut-out when the insert member is in proper position.

6. An educational puzzle comprising a mounting base, a generally rectangular mounting recess formed in said base, said mounting base including a raised figure of a clown or the like, said figure including a partial face, and at least one generally rectangular insert member corresponding to a letter or number symbol adapted to be positioned in said mounting recess, said insert member including a peripheral portion located immediately adjacent the said partial face when said insert member is properly positioned in said mounting recess to complete the picture of the face.

7. The structure set forth in claim 6 wherein said figure includes a pair of generally perpendicular arms of different lengths, the size and configuration of said mounting recess being approximately the same as said insert member, two edges of said insert member abutting said arms when the insert is properly positioned.

8. The structure set forth in claim 7 wherein said peripheral portion of said insert member comprises an arcuate cut-out immediately adjacent to said partial face when said member is properly positioned such that the face is completed and appears to smile.

9. The structure set forth in claim 8 wherein said mounting base is three-dimensional and comprised of a plurality of laminated members.

10. The structure set forth in claim 9 wherein said laminated members are contrastingly colored for easy visual recognition of said mounting recess and figure.

* * * * *